Patented July 25, 1944

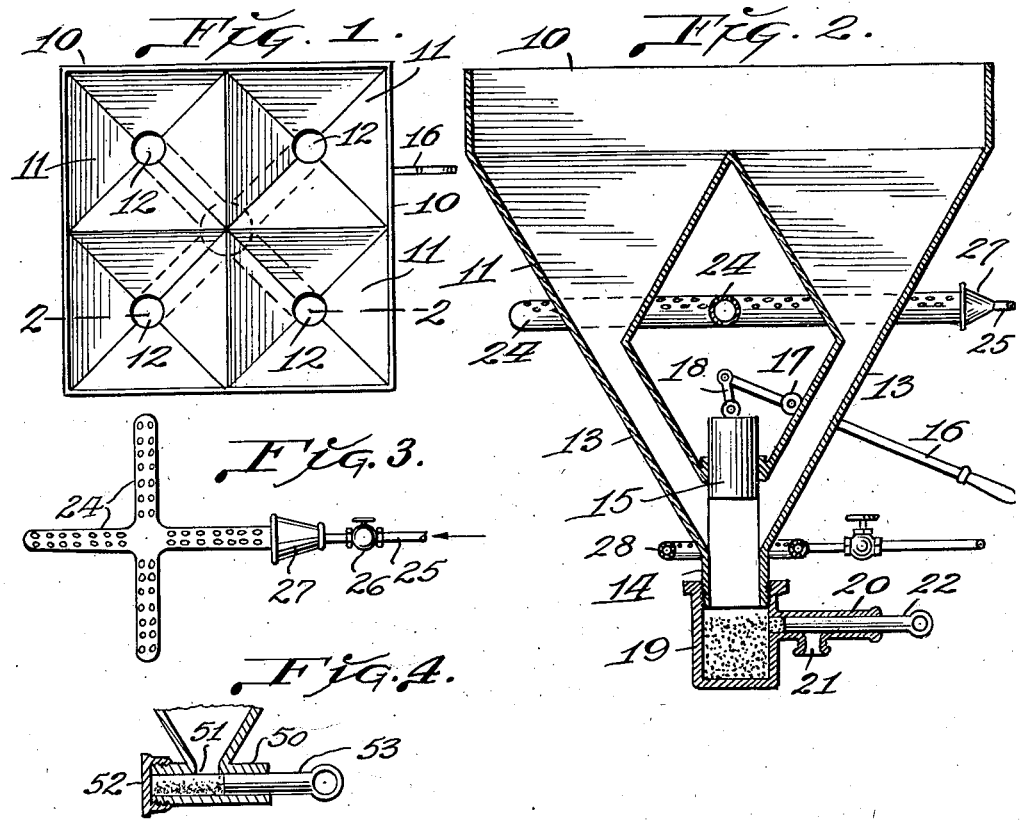

2,354,487

UNITED STATES PATENT OFFICE 2,354,487

DEEP FAT FRYING KETTLE

Meyer Thompson, Los Angeles, Calif.

Application September 20, 1941, Serial No. 411,671

4 Claims. (Cl. 99—408)

My invention relates generally to culinary apparatus and more particularly to a deep fat frying kettle such, for instance, as is used in the cooking of doughnuts, fried cakes, potato chips, chicken fried steaks, and like food products.

The principal objects of my invention are, to generally improve upon and simplify the existing forms of deep fat frying kettles, and to provide a kettle wherein all sediment which develops from cooking of various food products in the kettle will, by gravity, pass into a sediment receptacle and which latter may be readily removed from the kettle without the necessity for withdrawing the oil or grease from said kettle and which operation it will be understood involves considerable time, labor, and consequent expense.

Further objects of my invention are, to provide a deep fat frying kettle of the character referred to which may be conveniently used without the necessity for the frequent straining or filtering of the oil or grease in which the food products are cooked, thus saving time and labor in the cooking operations, further, to provide a construction which may be easily cleaned from time to time so as to be maintained in a sanitary condition, and further, to provide a deep fat frying kettle of extremely simple construction, lending itself to economical production and capable of being operated at high efficiency.

With the foregoing and other objects in view, my invention consists in certain novel features of construction and arrangement of parts that will be hereinafter more fully described and claimed and illustrated in the accompanying drawing in which:

Fig. 1 is a top plan view of a deep fat frying kettle constructed in accordance with my invention.

Fig. 2 is an enlarged vertical section taken on the line 2—2 of Fig. 1.

Fig. 3 is a plan view of one of the burners used in heating the kettle and its contents.

Fig. 4 is a detail sectional view of a modified form of the valve that controls the sediment outlet from the kettle.

Referring by numerals to the accompanying drawing, 10 designates the upper portion of a deep fat frying kettle, the lower portion thereof comprising four inverted pyramid-shaped members 11 provided at their lower ends with openings 12, and connected to the lower ends of these members 11 and communicating with said openings 12 are the upper ends of inclined tubes 13 which converge toward their lower ends.

In order to achieve best results, the bottoms of the inverted pyramid-shaped members 11 and the tubes 13 should occupy angular positions of not more than forty-five degrees with respect to the vertical.

The lower ends of the inclined tubes 13 communicate with a short vertically disposed tube 14 and arranged for sliding movement in the upper portion of said tube is a cylindrical member 15 which performs the functions of a valve, for when moved downward to the position shown by dotted lines in Fig. 1 said member 15 cuts off communication between the tubes 13 and tube 14.

This cylindrical valve may be moved vertically within the upper portion of tube 14 by any suitable means, for instance, a lever 16 fulcrumed at 17, and the inner end of said lever being connected by link 18 to the upper end of said valve 15.

Removably connected to the lower end of the tube 14 is a sediment receptacle 19 and projecting outwardly from the upper portion thereof is a short tube 20 provided intermediate its ends with a depending outlet 21.

Arranged for sliding movement in member 20 is a rod 22 that performs the functions of a valve to control the outlet opening 21.

The side wall of the sediment receptacle 19 may be provided with one or more windows closed by transparent material such as mica or glass, or the entire receptacle may be formed of glass that is treated so as to resist relatively high degrees of heat, thus enabling the interior of the receptacle to be readily inspected.

Any suitable means for heating the kettle may be employed, but as illustrated in Fig. 2 I prefer to arrange between the lower portions of the inverted pyramidal members 11, a burner 24 having legs disposed substantially ninety degrees apart with the upper portions of the walls of said legs perforated to provide jet openings and said burner receiving gaseous fuel from a supply pipe 25 in which is located a valve 26 and an air mixing valve 27 (see Fig. 3).

In order to heat the oil or grease in the lower portions of the inclined tubes 13 and in the vertically disposed tube 14, a gaseous fuel burner 28 in the form of a ring surrounds the tube 14 just below the lower ends of the inclined tubes 13.

In the use of my improved kettle, the members 11 are filled or partially filled with grease which is brought to the boiling point or to the desired temperature by the heat from the flames issuing from the jets in burners 24 and 28.

The food products to be cooked are placed in the kettle and during the cooking operations, a certain amount of sediment is produced and discharges from the food products, and such sediment passes by gravity down the inclined walls of the kettle members 11 and downwardly through inclined tubes and after passing through the lower portion of the tube 14 this sediment accumulates in the receptacle 19. From time to time the rod 22 which serves as a valve may be partially withdrawn from tube 20 so as to open outlet 21, thus giving a positive indication to the operator of the kettle as to the amount of sediment contained in the receptacle.

When receptacle 19 has become filled or partially filled with sediment and it is desired to discharge the same, handle 16 is actuated so as to move cylindrical member 15 downwardly until the lower ends of the inclined tubes 13 are closed, and the receptacle 19 containing the sediment may now be detached from tube 14 with the escape of very little, if any, grease or oil from the kettle.

After the sediment has been removed from the receptacle 19 the same is repositioned upon the lower end of tube 14 after which valve member 15 is elevated to open the lower ends of the tubes 13, and the cooking operations may now be continued.

This periodic removal of the sediment developed in the kettle during cooking operations maintains the grease or oil in clean condition and thus periodic straining of the oil or grease is eliminated with the result that a material saving of the time and labor ordinarily involved in the operation of deep fat frying kettles is eliminated.

It is to be noted that the kettle is provided with one or more portions of inverted pyramidal or conical shape, and such construction is particularly advantageous for the reason that considerably less grease or oil is required for the cooking functions than where the standard or conventional forms of kettles are used and which latter are generally cylindrical in shape. A further advantage is a material saving of the time and fuel required to heat the comparatively small amount of grease or oil used in the kettle and the maintenance of the required degree of heat during the cooking or frying function.

Thus it will be seen that I have provided a deep fat frying kettle that is relatively simple in construction, inexpensive of manufacture and very effective in performing the functions for which it is intended.

It will be understood that minor changes in the size, form and construction of the various parts of my improved deep fat frying kettle, may be made and substituted for those herein shown and described, without departing from the spirit of my invention, the scope of which is set forth in the appended claims.

I claim as my invention:

1. A deep fat frying kettle having a plurality of depending portions that gradually decrease in size toward their lower ends, inclined tubes leading downwardly from the lower portions of said kettle, a tube with which the lower ends of said inclined tubes communicate, a sediment receptacle detachably connected to the lower portion of said tube and valvular means for controlling the passage of sediment from the lower ends of said inclined tubes into the tube to which the sediment cup is connected.

2. A deep fat frying kettle provided in its lower portion with a plurality of chambers that gradually decrease in size toward their lower ends, said chambers being provided at their lower ends with outlet openings, inclined tubes leading downwardly from said outlet openings, a tube connected to the lower ends of said inclined tubes, a sediment receptacle detachably connected to the lower end of said tube and operable means for controlling the discharge of sediment from the lower ends of said inclined tubes into the tube to which the sediment receptacle is connected.

3. A deep fat frying kettle the lower portion of which decreases in size toward its lower end, there being an opening in the lower end of said kettle, a sediment receptacle detachably connected to the lower end of said kettle and communicating with the opening therein, means on said sediment receptacle for ascertaining the height of accumulated sediment within said receptacle and valvular means controlling the opening at the lower end of said kettle means on said sediment receptacle for ascertaining the height of the sediment accumulation within said receptacle, means disposed above said valvular means for heating said kettle and heating means surrounding the outlet portion of said receptacle between said valvular means and said sediment trap.

4. In a deep fat frying kettle, a substantially funnel-shaped receptacle provided at its lower end with an outlet opening, a sediment trap connected to the lower portion of said receptacle and communicating with said outlet, said sediment trap being provided with an outlet, means normally closing the outlet from said sediment trap, primary heating means arranged adjacent the lower portion of said receptacle and a secondary heating means arranged between said valvular means and said sediment trap, valvular means for controlling the passage of sediment from said receptacle to said trap, primary heating means arranged adjacent the lower portion of said receptacle and a secondary heating means arranged between said valvular means and said sediment trap.

MEYER THOMPSON.